(12) United States Patent
Bourget et al.

(10) Patent No.: US 8,882,291 B1
(45) Date of Patent: Nov. 11, 2014

(54) LED OMNI-STRIP LIGHTING SYSTEM

(75) Inventors: Christopher Michael Bourget, Fitchburg, WI (US); John Cottrell Vignali, Waunakee, WI (US); Robert Curtis Morrow, Madison, WI (US)

(73) Assignee: Orbital Technologies Corporation, Madison, WI (US)

( * ) Notice: Subject to any disclaimer, the term of this patent is extended or adjusted under 35 U.S.C. 154(b) by 339 days.

(21) Appl. No.: 13/424,664

(22) Filed: Mar. 20, 2012

(51) Int. Cl.
*F21V 9/00* (2006.01)

(52) U.S. Cl.
USPC . 362/231; 362/227; 362/249.02; 362/249.04; 315/152; 315/185 R; 315/294; 315/312

(58) Field of Classification Search
CPC .......... F21S 4/00; F21V 21/10; F21V 19/001; F21V 29/2293; F21V 9/00
USPC ............... 315/227, 230, 231, 249.02, 249.04, 315/249.08, 800, 150, 152, 153, 185 R, 293, 315/294, 312; 362/150, 152, 153, 185 R, 362/293, 294, 312, 227, 230, 231, 249.02, 362/249.04, 249.08, 800
See application file for complete search history.

(56) References Cited

U.S. PATENT DOCUMENTS

| | | | |
|---|---|---|---|
| 2005/0213321 A1* | 9/2005 | Lin | 362/231 |
| 2010/0008090 A1* | 1/2010 | Li et al. | 362/249.03 |
| 2012/0162990 A1* | 6/2012 | Crandell et al. | 362/249.04 |

* cited by examiner

*Primary Examiner* — Douglas W Owens
*Assistant Examiner* — Thai Pham
(74) *Attorney, Agent, or Firm* — Dorsey & Whitney LLP

(57) ABSTRACT

An LED-based lighting system is provided for aquariums, habitats, farms, terrariums, and/or enclosures for keeping animals and/or plant life and/or other enclosures. In one embodiment, the LED-based lighting system includes an LED circuit board or strip adapted to provide a particular wavelength of light, such as, red, blue, or green light. Several circuit boards or strips may be strung together end-to-end or side-to-side and, while each circuit board or strip may be adapted for providing a particular wavelength of light, the several circuit boards or strips may be adapted to provide several wavelengths of light, e.g. a mixture of spectrum. The several circuit boards, while providing different wavelengths of light, may be substantially the same in most respects except for the LED's positioned on the strip and a jumper selectively connected to provide a control signal line adapted for controlling the particular wavelength LED installed on the respective strip.

20 Claims, 3 Drawing Sheets

LED OMNI-STRIP LIGHTING SYSTEM

FIELD OF THE INVENTION

The present invention relates generally to LED-based lighting systems, and more particularly to LED-based lighting systems for aquariums, habitats, farms, terrariums, and/or enclosures for keeping animals and/or plant life and/or other enclosures.

BACKGROUND OF THE INVENTION

There are LED-based lighting systems currently available that promote growth for aquariums, plants and/or animal habitats, farms, terrariums, and/or enclosures for keeping animals and/or plant life and/or other enclosures. These LED-based lighting systems include an LED source offering spatial control of spectral output which can allow a user-defined or preprogrammed appropriate spectrum for growth of specific plant and animal life. Though these lighting systems are satisfactory, it is desirable to accommodate multiple LED colors of interest to a specific user, and to populate lighting assemblies in a multitude of configurations. Accordingly, there is a need for an LED lighting systems that can meet multiple lighting function needs, allowing large scale manufacturing runs and reducing parts cost. Further, there is a need for multiple small to mid-scale lighting systems without having to continuously design different printed circuit board configurations, each requiring additional manufacturing tooling.

SUMMARY OF THE INVENTION

The present invention provides LED lighting systems for aquariums, habitats, farms, terrariums, and/or enclosures for keeping animals and/or plant life and/or other enclosures. More particularly, the present invention provides LED-based lighting systems with an LED source offering spatial control of spectral output which allows a user-defined or preprogrammed appropriate spectrum for growth of specific plant and animal life, accommodates multiple LED colors of interest to a specific user, and populates lighting assemblies in a multitude of configurations. Further, the present invention allows large scale manufacturing runs and reducing parts cost. Furthermore, the present invention provides multiple small to mid-scale lighting systems without having to continuously design different printed circuit board configurations, each requiring additional manufacturing tooling. The characteristics of the present invention include the following features:

- LED-based lighting system includes a printed circuit board which contains multiple LED pad configurations to allow use of broad range of LED colors and multiple manufacturer LED footprints.
- LED-based lighting system accommodates a wide range of LED wavebands or wavelengths, such as near UV, blue, green, yellow, amber, red, far red, near infrared and different color temperatures of white.
- LED-based lighting system accommodates LEDs useful for many applications including green plant lighting, animal lighting, microorganism lighting, and lighting for human habitation and work areas, including for a variety of task applications.
- LED-based lighting system includes circuits that are configurable for different light levels and spectral mixes.
- LED-based lighting system contains quick snap-together connectors to allow placement of strips in serial or parallel circuit configurations.
- LED-based lighting system contains circuits that include jumper pads to facilitate use of different LED types.
- LED-based lighting system includes circuits that accommodate independent control of separate colors.
- LED-based lighting system includes circuits that accommodate electrical components of different electrical characteristics to allow a printed circuit board to be adapted to a specific color or type of LED.
- LED-based lighting system includes LED drivers that are incorporated on strips to eliminate need for separate driver printed circuit board and housing, and to improve system flexibility.
- LED-based lighting system includes an LED strip design that minimizes wiring when assembled into arrays reducing components and labor.
- LED-based lighting system includes LED strips that are protected for greenhouse and other harsh environments.
- LED-based lighting system includes circuits with test points which allow easy trouble shooting of LED components and the system.
- LED-based lighting system includes LED strips which accommodate heat sinking to maintain specified LED temperatures.

In one embodiment, the present invention is directed toward an LED-based lighting system having an LED circuit board or strip adapted to provide a particular wavelength of light, such as, red, blue, or green light. Several circuit boards or strips may be strung together end-to-end or side-to-side and, while each circuit board or strip may be adapted for providing a particular wavelength of light, the several circuit boards or strips may be adapted to provide several wavelengths of light, e.g. a mixture of spectrum. The several circuit boards, while providing different wavelengths of light, may be substantially the same in most respects except for the LED's positioned on the strip and a jumper selectively connected to provide a control signal line adapted for controlling the particular wavelength LED installed on the respective strip.

Further in one embodiment of the present invention, an LED-based lighting system comprises: a plurality of circuit boards connected to one another, each of the circuit boards comprising: a circuit board having an input connector and an output connector in electrical communication with one another; a plurality of LED mounting stations arranged on the circuit board, each of the mounting stations having at least two mounting pads adapted to receive selected LED types; a plurality of LEDs having substantially the same wavelength, each being arranged in respective mounting stations of the plurality of mounting stations; a plurality of input control lines each being adapted to supply power to LEDs with a selected wavelength; and a driver circuit in electrical communication with the plurality of mounting stations and being in electrical communication with the input connector via one of the plurality of input control lines, the one of the plurality of input control lines being connected to the input connector with a jumper.

BRIEF DESCRIPTIONS OF THE DRAWINGS

DETAILED DESCRIPTIONS

Figure 1:
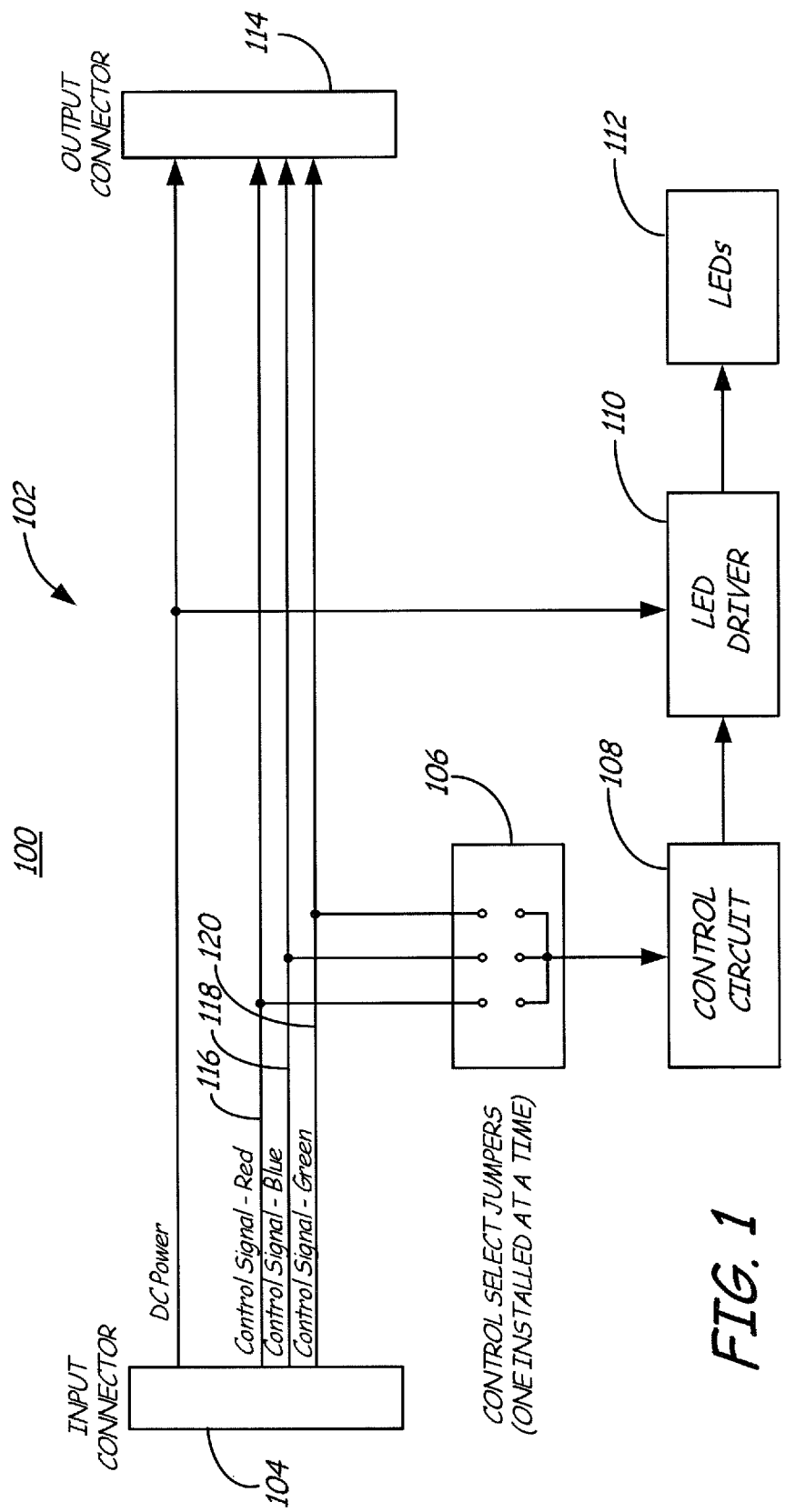
FIG. 1 illustrates a block diagram of one embodiment of an LED-based lighting system in accordance with the principles of the present invention.

In FIG. 1, an LED-based lighting system 100 includes an LED circuit board or strip 102 according to one embodiment of the present invention. The lighting system 100 may include one or more strips 102. Each of the strips 102 may include a substrate having a circuit assembly arranged thereon. The lighting system 100 may include an input connector 104, a control select jumper 106 which connects one of control signal lines 116, 118, 120 (e.g. control signals for color Red, color Blue, color Green, etc.) to a control circuit 108 which drives an LED driver 110 to activate LEDs 112, and an output connector 114.

In some embodiments, the system 100 may also include cross-connect solder points for use in connecting several circuit boards side-to-side. As such, in addition to the strips 102, the lighting system 100 may also include one or more cross-connect boards 132.

The substrate of the strips 102 may be an insulating material including an epoxy resin prepreg material or other suitable circuit board substrates, including for example, metal core printed circuit boards. The circuit assembly may include an electrically conductive circuit arranged on the substrate using a copper foil or other conducting material.

The input connector 104 of the system 100 may be configured for connection to the control circuit 108 or to an output connector 114 of an adjacent strip 102. The input connector 104 may be configured for receiving electrical control signals for multiple wavelengths of LEDs. For example, the input connector 104 may include connection points for three wavelengths of LEDs, for example, red, blue, and green. Other connection points may also be provided, for example, connection points for other colors, and other connection points for receiving other electrical signals. The output connector 114 of the system 100 may be similar to the input connector 104 and may be adapted for connection to an input connector 104 of an adjacent strip 102.

A bypass circuit may extend between the input connector 104 and the output connector 114 and may be adapted to maintain the integrity of electrical signals and pass the electrical signals on to adjacent strips 102. As such, whether the particular strip 102 that is energized by a particular control signal is being activated (i.e., LEDs being lit) or not by the control signal, the electrical signals may be passed downstream for use by other strips 102 connected thereto. In some embodiments, the bypass circuit may include a bypass bus for each of the connection points on the input connector 104 that lead to a corresponding connection point on the output connector 114.

It is appreciated that a variety of suitable connectors 104, 114 may be used within the scope of the invention. For example, one type may be Samtec #MMS-108-02-L-SH, and another type may be TE Connectivity (Tyco) #2058703-3.

The circuit assembly of the lighting system 100 may also include one or more LED mounting stations. The mounting stations may be configured to receive LEDs of multiple types. For example, in one embodiment, a mounting station may be adapted to receive one of two types of LEDs. In other embodiments, a mounting station may be adapted to receive one of three, or one of four types of LEDs. Also, a mounting station may be adapted for a particular type of LED or an assortment of LEDs. In one embodiment, the mounting station may be adapted to receive a Philips Lumileds "Rebel" series brand LED and an Osram "Olson SSL" series brand LED. It is appreciated that other types of LEDs may be used without departing from the scope of the invention. In some embodiments, the circuit assembly may include from 1 to 24 mounting stations, or from 3 to 12 mounting stations, or six mounting stations, for example, may be provided. It is appreciated that a different number of mounting stations may be provided within the scope of the invention.

The mounting stations may be associated with the LED driver 110 for driving the LEDs 112 arranged in the mounting stations. The LED driver 110 may be configured for driving LEDs 112 with a range of wavelengths. The LED driver 110 may include a resistor for selecting a drive current flowing through the LEDs 112, and the resistor or a series of resistors may be selected to provide a suitable current for a particular wavelength LED. The drive current may extend up to, for example, 1000 mA, and the strips 102 may operate on a voltage ranging from approximately 20 VDC up to 48 VDC. A maximum drive current select resistor or a series of resistors may be provided as part of the LED driver circuit 110.

One of the control signal lines 116, 118, 120 is selectively connected to the control circuit 108 with the suitable jumper 106 selected in conjunction with the LED driver circuit 110 to provide a suitable driver control signal for the LEDs 112 on the strip 102. For example, the first control signal line 116 may be connected to the control circuit 108 and the LED driver circuit 110 with a first jumper 106 that when combined with the LED driver circuit 110, provides a driver current suitable for a particular LED wavelength such as red. Alternatively, the second control signal line 118 may be connected to the control circuit 108 and the LED driver circuit 110 with a second jumper 106, that when combined with the LED driver circuit 110, provides a driver current suitable for a particular LED wavelength such as blue. In still another alternative, the third control signal line 120 may be connected to the control circuit 108 and the LED drive circuit 110 with a third jumper 106, that when combined with the LED driver circuit 110, provides a driver current for a green LED. In still other embodiments, multiple control signal lines may be connected to the control circuit 108 and the LED driver circuit 110 with multiple jumpers to provide a driver current for a selected wavelength LED.

It is appreciated that a variety of suitable jumpers 106 may be used without departing the scope of the invention. The jumper is typically referred to as a "zero-ohm" resistor, for example, Yageo #RC0805JR-070RL jumper.

The lighting system 100 may also include a cross-connect board 132 for use in arranging the circuit boards or assemblies side-to-side. The cross-connect board 132 may include a substrate and a cross-connect circuit arranged thereon. The cross-connect circuit may include a plurality of contacts adapted for electrical contact with the cross-connect solder points on the circuit boards or strips 102 such that the circuit boards or strips 102 may be placed in electrical communication via the cross-connect board 132.

Figure 2:
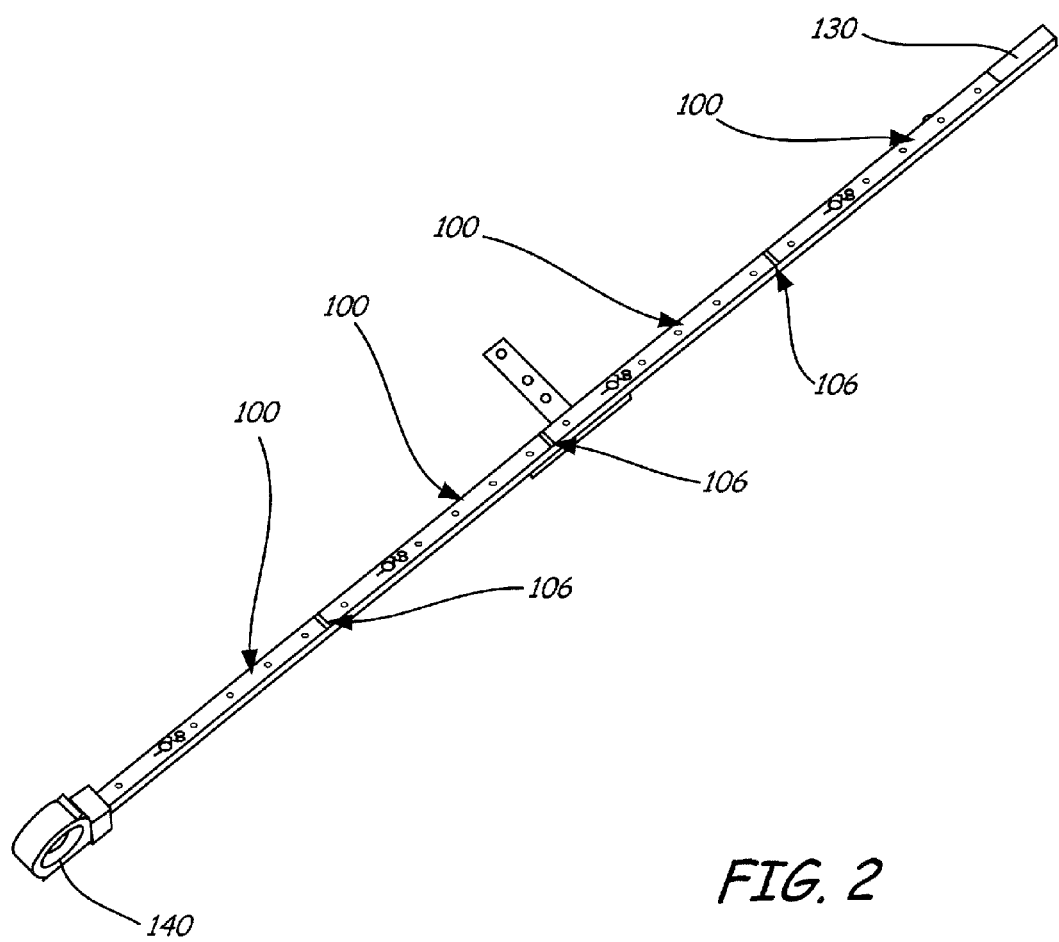
FIG. 2 illustrates a prospective view of one embodiment of an LED-based lighting system in a strip design with LED strips connected in serials.
Figure 3:
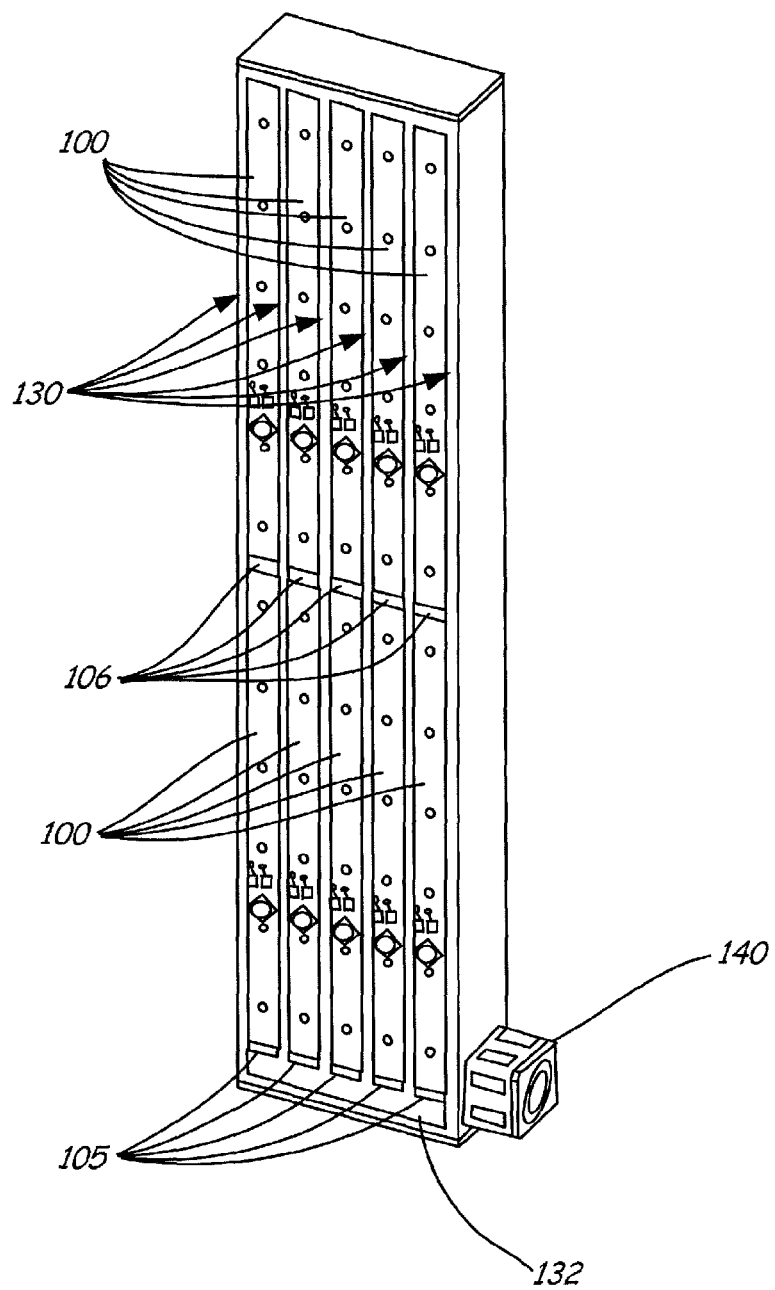
FIG. 3 illustrates a prospective view of one embodiment of an LED-based lighting system in a strip design with LED strips connected in serials and in parallel.

In one embodiment, the circuit board or strip 102 or plurality of circuit boards 102 may be mounted to a heat sink surface 210 or a plurality of heat sink surfaces for purposes of controlling the temperature of the circuit boards or strips 102. As shown in FIGS. 2 and 3, a cooling system, such as a cooling fan 140, may also be mounted to the lighting system 100 to dissipate the heat generated from the LED-based lighting system 100.

In use, one or more of the circuit boards or strips 102 may be used to provide lighting to a greenhouse or other enclosure. The one or more circuit boards or strips 102 may be controlled by activating control signals corresponding to the colors of LED light desired. For example, where red light is desired, a control system may connect the input connector 104 of the circuit board or strip 100. The connection point may energize the corresponding bypass bus and the corresponding output connection point as well as the corresponding control signal line. Where the corresponding control signal line is jumped to the LED driver circuit 110, the LED driver circuit 110 may be energized thereby energizing the mounting stations and illuminating the LEDs 112. Where the energized circuit board 100 is connected to an additional circuit board or strip 102, the connection between the respective output connection points and the input connection points of the circuit boards 100 may cause the second circuit board or strip 102 to be energized similar to the first. In this manner, where a connection point on a first circuit board or strip 102 is energized, all of the corresponding connection points on the connected circuit boards 100 or strip will be energized causing all circuit boards or strips 100 having the same jumper in place on respective signal lines to all illuminate. As such, if the controller selects red light, all connected circuit boards or strip 102 configured to produce red light will illuminate and those configured to produce other light colors will not. In some embodiments, multiple colors may be selected allowing the different colors of light from several circuit boards or strips 102 to be combined and allowing custom spectra to be created.

One of the advantages of the present invention is that several circuit boards or strips 102 may be constructed that differ only in the LED's installed on the boards 102 and the type and location of a jumper 106. In addition, any number of circuit boards 102 may be connected to provide a lighting system 100 having multiple wavelengths and associated colors available. These circuit boards or strip 102 may be connected end-to-end as shown in FIG. 2, side-to-side, or in some combination of end-to-end and side-to-side as shown in FIG. 3.

It is to be appreciated that other circuit boards may be designed to provide a single selected wavelength of light and that can be connected end-to-end, side-to-side, or otherwise connected to provide custom spectra. Other arrangements of elements on the circuit board or strip as well as other combinations of electrical circuitry may also be provided.

These and other features of the present invention will become apparent to those skilled in the art. As it will be realized, the present invention is capable of modifications in various respects, all without departing from the spirit and scope of the present invention.

What is claimed is:
1. An LED-based lighting system, comprising:
   a plurality of circuit hoards connected to one another to form the lighting system, each of the circuit hoards comprising:
      a circuit hoard having an input connector and an output connector in electrical communication with one another;
      a plurality of LED mounting stations arranged on the circuit board, each of the mounting stations having at least two mounting pads adapted to receive selected LED types;
      a plurality of LEDs having a selected wavelength, each LED being arranged in a respective mounting station of the plurality of mounting stations;
      a power line configured to power the LEDs via an LED driver circuit; and
      a plurality of input control lines each being adapted to supply the power to the LEDs with the selected wavelength via the LED driver circuit in electrical communication with the plurality of mounting stations, wherein the LED driver circuit is in electrical communication with the input connector via a selected one of the input control lines being connected to the input connector with a jumper;
   wherein the plurality of circuit boards provide LEDs having different selected wavelengths; and
   wherein multiple colors are selected by connecting each jumper to the selected one of the input control lines adapted for controlling the selected wavelengths of the LEDs arranged on each respective circuit board.

2. The lighting system of claim 1, wherein the plurality of input control lines includes three or more input control lines and the jumper provides a zero-ohm link to the selected one of the input control lines.

3. The lighting system of claim 2, wherein the three input control lines are adapted to supply control signals to different pluralities of red, blue, and green LEDs, respectively.

4. The lighting system of claim 1, wherein the plurality of LEDs arranged on one of the circuit boards comprise red LEDs and the selected one of the plurality of input control lines on the respective circuit board is adapted to control the red LEDs.

5. The lighting system of claim 4, wherein the plurality of LEDs arranged on another of the circuit boards comprise blue LEDs and selected one of the plurality of input control lines on the other circuit board is adapted to control the blue LEDs.

6. The lighting system of claim 5, wherein the plurality of LEDs arranged on a further one of the circuit boards comprise green LEDs and the selected one of the plurality of input control lines on the further circuit board is adapted to supply control the green LEDs.

7. The lighting system of claim 1, wherein the plurality of circuit boards includes different circuit boards having LEDs with selected wavelengths including near UV and near infrared, respectively.

8. The lighting system of claim 1, wherein each of the circuit board is provided in a strip design and the plurality of circuit boards is connected end-to-end.

9. The lighting system of claim 1, further comprising a cross-connect board, wherein at least two of the plurality of circuit boards are connected side-to-side via the cross-connect board.

10. The lighting system of claim 1, wherein the at least two mounting pads include a first mounting pad having a footprint adapted for receiving an LED from a first manufacturer and a second mounting pad having a footprint adapted for receiving an LED from a second manufacturer, such that each circuit board accommodates multiple manufacturer LED footprints without additional tooling.

11. The lighting system of claim 1, wherein each of the plurality of circuit boards are mounted to a heat sink surface configured to control a temperature of the LEDs.

12. The lighting system of claim 1, wherein each of the plurality of mounting stations is adapted to receive LEDs from different manufactures without additional tooling.

13. A circuit apparatus, comprising:
   a plurality of circuit assemblies arranged on substrates to form the lighting system, each circuit assembly comprising:
      an input connector and an output connector in electrical communication with one another;

an LED mounting station arranged on the circuit board and having a mounting pad adapted to receive a selected LED type;

an LED of the selected type having a selected wavelength arranged in the mounting station;

a power line configured to power the LED via an LED driver circuit; and a plurality of input control lines each being adapted to selectively supply the power to the LED via the LED driver circuit being in electrical communication with the mounting station, wherein the LED driver circuit is in electrical communication with the input connector via a selected one of the plurality of input control lines being connected to the input connector with a jumper;

wherein the plurality of circuit assemblies provide LEDs having different selected wavelengths; and wherein multiple colors are selected by connecting each jumper to the selected one of the input control lines adapted for controlling the selected wavelength of the LED arranged on each of the respective circuit assemblies.

14. The circuit apparatus claim 13, wherein the jumper provides a zero-ohm link to the selected one of input control lines.

15. The circuit apparatus of claim 13, wherein the control lines are adapted to supply control signals to red, blue, and green LEDs on different circuit assemblies.

16. The circuit apparatus of claim 13, wherein the plurality of circuit assemblies includes different circuit assemblies having LEDs with selected wavelengths including near UV and near infrared, respectively.

17. The circuit apparatus of claim 13, wherein some of the plurality of circuit assemblies are connected end-to-end in a strip design.

18. The circuit apparatus of claim 17, wherein at least two of the plurality of circuit assemblies are connected side-to-side via a cross-connect board.

19. The circuit apparatus of claim 13, wherein each circuit assembly accommodates multiple manufacturer LED footprints without additional tooling.

20. The circuit apparatus of claim 13, wherein each of the plurality of circuit boards comprises a heat sink configured to maintain a temperature of the LED.

* * * * *

UNITED STATES PATENT AND TRADEMARK OFFICE
CERTIFICATE OF CORRECTION

PATENT NO. : 8,882,291 B1  
APPLICATION NO. : 13/424664  
DATED : November 11, 2014  
INVENTOR(S) : Christopher Michael Bourget, John Cottrell Vignali and Robert Curtis Morrow Page 1 of 1

It is certified that error appears in the above-identified patent and that said Letters Patent is hereby corrected as shown below:

In the Claims

At Column 5, Line 55, Claim 1, Line 2
  "a plurality of circuit hoards"

should read:
  --a plurality of circuit boards--

At Column 5, Line 56, Claim 1, Line 3
  "each of the circuit hoards"

should read:
  --each of the circuit boards--

At Column 5, Line 58, Claim 1, Line 5
  "a circuit hoard having an input"

should read:
  --a circuit board having an input--

At Column 6, Lines 36-37, Claim 6, lines 4-5
  "adapted to supply control the green"

should read:
  --adapted to control the green--

Signed and Sealed this
Third Day of March, 2015

Michelle K. Lee
*Deputy Director of the United States Patent and Trademark Office*